W. H. GATES.
SPARK PLUG.
APPLICATION FILED FEB. 28, 1913.

1,141,052.

Patented May 25, 1915.

Witnesses:
C. F. Wesson,
E. M. Allen.

Inventor:
W. H. Gates.
by attorneys
Southgate & Southgate

UNITED STATES PATENT OFFICE.

WILLIAM H. GATES, OF NEW HAVEN, CONNECTICUT, ASSIGNOR TO EASTERN MACHINE SCREW CORPORATION, OF NEW HAVEN, CONNECTICUT, A CORPORATION OF CONNECTICUT.

SPARK-PLUG.

1,141,052.  Specification of Letters Patent.  Patented May 25, 1915.

Application filed February 28, 1913. Serial No. 751,235.

*To all whom it may concern:*

Be it known that I, WILLIAM H. GATES, a citizen of the United States, residing at New Haven, in the county of New Haven and State of Connecticut, have invented a new and useful Spark-Plug, of which the following is a specification.

The object of this invention is to provide a new and improved spark plug construction, and particularly relates to the packing for sealing the porcelain to the base.

The invention is illustrated in the accompanying drawing, in which—

Figure 1:
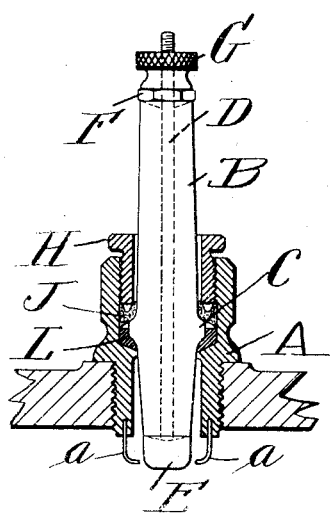
Figure 2:
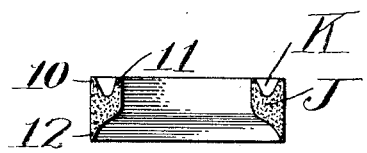

Figure 1 is a sectional elevation of the improved construction; and Fig. 2 is a sectional elevation of the packing on an enlarged scale.

Referring to the drawing, A designates the usual base which is provided with a screw-threaded shank to engage into the wall of the motor cylinder.

B designates the porcelain which fits into said base, and which has a shoulder C. A conductor D having a head E at its lower end is passed through said porcelain, and a nut F is threaded thereon. The usual binding nut G is also threaded on the end of the conductor D.

H designates a tubular nut which is threaded into the top of the base A.

J designates the improved ring packing. The same is made of composition or soft metal, and is provided with a V-shaped groove K in its upper face, the groove forming outer and inner annular flanges 10 and 11. The packing is also provided with a depending lower flange 12. The lower end of the nut H is shaped to engage the top edges of the flanges 10 and 11. A soft metal packing L is usually arranged in the base A for the shoulder C of the porcelain to bear upon.

The base A is provided with one or more metallic terminals *a—a* set in such relation to the head E as to form the usual spark gap or spark gaps.

In assembling the parts, the soft metal packing L is placed in the base A, the porcelain B then fitted into the base, the packing J placed on top of the shoulder C of the porcelain, and the nut H then threaded into the base A. As the lower end of the nut engages the packing J, the annular flange 10 will be forced outwardly to engage with the base A, and the inner flange 11 will be forced inwardly to engage with the porcelain B. Thus a very tight joint is made between the parts.

The depending lower flange 12 of the packing J is so shaped that the action of pressure on the same will tend to expand the same into contact with the base A. Thus a very simple and efficient construction is provided which will be free from leakage.

The details and arrangements herein shown and described may be greatly varied by a skilled mechanic without departing from the scope of the invention as expressed in the claim.

Having thus fully described my invention, what I claim and desire to secure by Letters-Patent is:—

A spark plug comprising a base, a shouldered porcelain seated therein, a conductor extending through the porcelain, a tubular nut threaded into the base, and a ring packing arranged between the nut and the shoulder on the porcelain, said packing having a pair of upwardly extending flanges on its upper edge separated by a V-shaped groove, and said nut having its lower end shaped to engage said flanges near their top edges and being effective when tightened to force one flange of the packing outwardly against the base and force the other flange of the packing inwardly against the porcelain thereby sealing the porcelain in the base.

In testimony whereof I have hereunto set my hand, in the presence of two subscribing witnesses.

WILLIAM H. GATES.

Witnesses:
BENJ. P. GREENE,
F. E. MEEKER.